F. G. WHITTIER.
PARCEL ROUTING APPARATUS.
APPLICATION FILED DEC. 4, 1912.
1,093,815.
Patented Apr. 21, 1914.
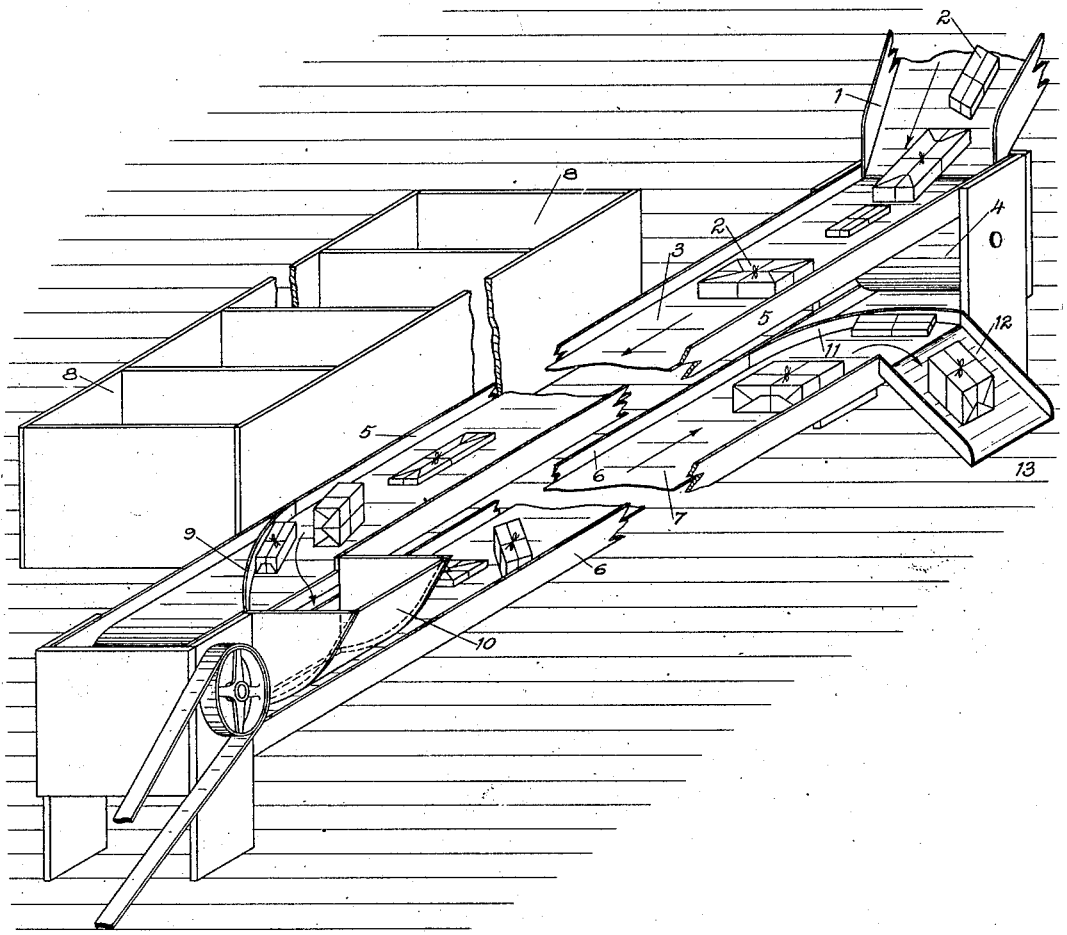
WITNESSES:
Harry M. Godden.
William L. Doten.
INVENTOR.
Frederick G. Whittier.
BY
Chas P Hidden
his ATTORNEY.

UNITED STATES PATENT OFFICE.

FREDERICK G. WHITTIER, OF BROOKLINE, MASSACHUSETTS, ASSIGNOR TO THE LAMSON COMPANY, OF BOSTON, MASSACHUSETTS, A CORPORATION OF NEW JERSEY.

PARCEL-ROUTING APPARATUS.

1,093,815. Specification of Letters Patent. Patented Apr. 21, 1914.

Application filed December 4, 1912. Serial No. 734,830.

*To all whom it may concern:*

Be it known that I, FREDERICK G. WHITTIER, of Brookline, in the county of Norfolk and Commonwealth of Massachusetts, have invented certain new and useful Improvements in Parcel-Routing Apparatus, of which the following is a specification.

This invention relates to parcel routing apparatus and more especially to a package or parcel handling mechanism particularly adapted for use in the shipping departments of stores and in post offices and the like.

It has for one of its objects the provision of parcel carrying means of such a nature as to expose and permit of the ready removal therefrom of labeled packages or parcels, so as to facilitate the distribution of said packages to appropriate receptacles or bins, together with means for returning to a determined point the parcels which may not have been adequately marked or which may have been overlooked by the attendant or attendants and hence were not removed from the conveying means at the proper point along their line of travel. The said determined point is preferably so disposed with respect to the receptacles or bins and the conveying parts traveling theretoward, that the returned parcels may be rapidly replaced upon said parts preparatory for a second trip toward or past the bins, the labels having previously been inspected and if need be changed or supplied if missing. This and other objects of my invention will be hereinafter referred to, and the novel combinations of elements whereby said objects may be attained will be more particularly set forth in the appended claims.

In the accompanying drawing which forms a part hereof, I have shown a preferred form of apparatus but as I am aware that various modifications and changes may be made in this exemplification without departing from the spirit of my invention I desire not to be restricted thereto but to be limited only by the scope of the said claims.

The single figure shown is a perspective view of an apparatus constructed in accordance with the principles of my invention.

Therein a chute 1 is the preferred means for depositing parcels 2 upon the forwardly traveling surface 3 of a preferably endless flexible conveying device, in this instance a belt mounted upon pulleys 4 in a known manner. The conveying surfaces of the belt travel between guides 5—6; those designated 6 pertaining to the lower or return side 7 of said belt. The conveying device is preferably disposed adjacent a plurality of bins or receptacles 8, so that the labeled packages or parcels carried, preferably in an open or exposed manner upon the surface 3, may be removed by attendants as they arrive substantially opposite the bin for which they are marked or into which it is intended that they shall be deposited.

A deflector 9 provides means for automatically sweeping off side-wise the packages, which have not previously been removed, when they encounter it; the so removed packages falling into a hopper 10, or the like, which delivers them in turn to the return or under side 7 of the belt. By this latter, said parcels are returned toward a determined point so disposed with respect to the bins as to permit of replacement of any packages that it may be desired so to replace, upon the forward traveling surface of the belt preparatory to again conveying them past the bins. The parcels returning upon the lower or return side of the belt are preferably laterally removed therefrom at the said point by a deflector 11, or the like, and are deposited thereby upon a chute 12, leading if desired to the floor 13.

The advantages of the foregoing construction will be at once apparent since it frequently happens that parcels are either improperly or inadequately labeled or are overlooked by the said attendants so that they are not manually removed from the said belt surface 3. In such a case, the unremoved parcels are carried along by the belt until they are removed therefrom by the deflector 9 and automatically deposited on the return side of the belt to be finally delivered via chute 12 to the floor. Here an attendant inspects the labels of said packages and if they are properly labeled, and have been merely overlooked, returns them to the upper side of the belt. If a parcel be inadequately labeled it will be ordinarily, of course, conveyed in any suitable manner to the shipper whose duty it is to label the packages, after which it will again pass via chute 1 onto belt surface 3.

I have aimed to reduce the handling of mis-labeled or overlooked packages to a minimum and the construction in question, while simple and employing no moving parts other than the belt or its equivalent, which would commonly be employed under the prescribed conditions in any event, automatically returns such packages to a point where they may be either replaced upon the belt in the manner indicated or otherwise disposed of.

Having thus described my invention, what I claim is:

1. In apparatus for facilitating the distribution of parcels and the like, means, portions of which normally move in opposite directions, for conveying, by one of said portions, exposed parcels along a determined path from whence they may be distributed, means for diverting side-wise from said path parcels not previously removed from said means, and means for automatically delivering said diverted parcels to a returning portion of said means which moves in an opposite direction to that in which said parcels travel along said path.

2. In apparatus for facilitating the distribution of parcels and the like, means, portions of which normally move in opposite directions, for conveying, by one of said portions, exposed parcels along a determined path from whence they may be distributed, means for sweeping from said path parcels not previously removed from said means, means for automatically delivering the swept-off parcels to a returning portion of said means which moves in an opposite direction to that in which said parcels travel along said path, and means for laterally removing said returning parcels from said returning portion of the conveying means.

3. In apparatus for facilitating the distribution of parcels and the like, a flexible conveyer, the carrying surfaces of which are at all times substantially continuous and unbroken, said conveyer having an upper portion thereof normally moving in one direction and a lower portion normally moving in an opposite direction, means for diverting parcels from said upper to said lower portion, and means for thereafter laterally removing said diverted parcels from said lower portion.

4. In apparatus for facilitating the distribution of parcels and the like, a belt adapted to carry parcels upon both the upper and lower sides thereof, the carrying surfaces of said belt being at all times substantially continuous and unbroken, one side of said belt normally moving in one direction and the other side of said belt normally moving in an opposite direction, means, co-acting with said belt for removing parcels from one side thereof and for thereafter automatically delivering said removed parcels to the other side of said belt, and means, co-acting with said belt, to remove said parcels thereafter from said last mentioned side.

In testimony whereof I have affixed my signature, in the presence of two witnesses.

FREDERICK G. WHITTIER.

Witnesses:
B. J. SMITH,
CHAS. P. HIDDEN.